United States Patent [19]
Hagenbuch et al.

[11] Patent Number: 6,092,863
[45] Date of Patent: Jul. 25, 2000

[54] ASSEMBLY FOR AUTOMATICALLY OPENING THE TAILGATE OF A CONTAINER

[75] Inventors: LeRoy G. Hagenbuch, Peoria; James D. McPhail, Peoria Heights, both of Ill.

[73] Assignee: Philippi-Hagenbuch, Inc., Peoria, Ill.

[21] Appl. No.: 08/904,532

[22] Filed: Aug. 1, 1997

[51] Int. Cl.$^7$ ........................................................ B60P 1/64
[52] U.S. Cl. ........................... 296/184; 296/56; 414/498; 414/491; 414/414; 414/546; 298/23 D
[58] Field of Search ................................. 296/50, 56, 184, 296/183, 181; 298/38, 23 S, 23 A, 23 D; 414/498, 491, 546, 414, 425

[56] References Cited

U.S. PATENT DOCUMENTS

| | | | |
|---|---|---|---|
| 3,751,112 | 8/1973 | Hagenbuch | 296/50 X |
| 4,348,055 | 9/1982 | Meisner et al. | 296/56 X |
| 4,621,858 | 11/1986 | Hagenbuch | 296/56 |
| 4,678,235 | 7/1987 | Hagenbuch | 296/56 X |
| 5,100,279 | 3/1992 | Bjerk | 296/23 D X |
| 5,174,632 | 12/1992 | Hagenbuch et al. | 296/184 X |
| 5,531,559 | 7/1996 | Kruzick | 414/498 |
| 5,743,700 | 4/1998 | Wood, Jr. et al. | 414/498 |

FOREIGN PATENT DOCUMENTS

| | | | |
|---|---|---|---|
| 54-97975 | 2/1979 | Japan | 298/23 A |

*Primary Examiner*—D. Glenn Dayoan
*Assistant Examiner*—Jason Morrow
*Attorney, Agent, or Firm*—Leydig, Voit & Mayer, Ltd.

[57] ABSTRACT

An assembly which automatically opens the tailgate of a container when the container is tilted from a transport position to a dump position for rear dumping by a container transport vehicle is provided. The tailgate having a pair of side arms each of which is pivotally connected to a respective one of the side walls of the container such that the tailgate can rotate relative to the container between open and closed positions. The assembly of the present invention includes a counterbalance assembly which is pivotally connected to the frame of a container transport vehicle. The assembly also includes a hook member which is pivotally connected at one end thereof to the side arm of the tailgate and which has a free end. The counterbalance assembly including a hook pin and the free end of hook member being configured to engage the hook pin. The counterbalance assembly and the hook member being positioned on the container transport vehicle and the container respectively such that when the container is tilted from the transport position into the dump position by the container transport vehicle, the free end of the hook member engages the hook pin establishing a linkage, comprising the counterbalance assembly and the hook member, between the frame of the container transport vehicle and the container tailgate which causes the tailgate to rotate into the open position as the container is tilted into the dump position.

47 Claims, 18 Drawing Sheets

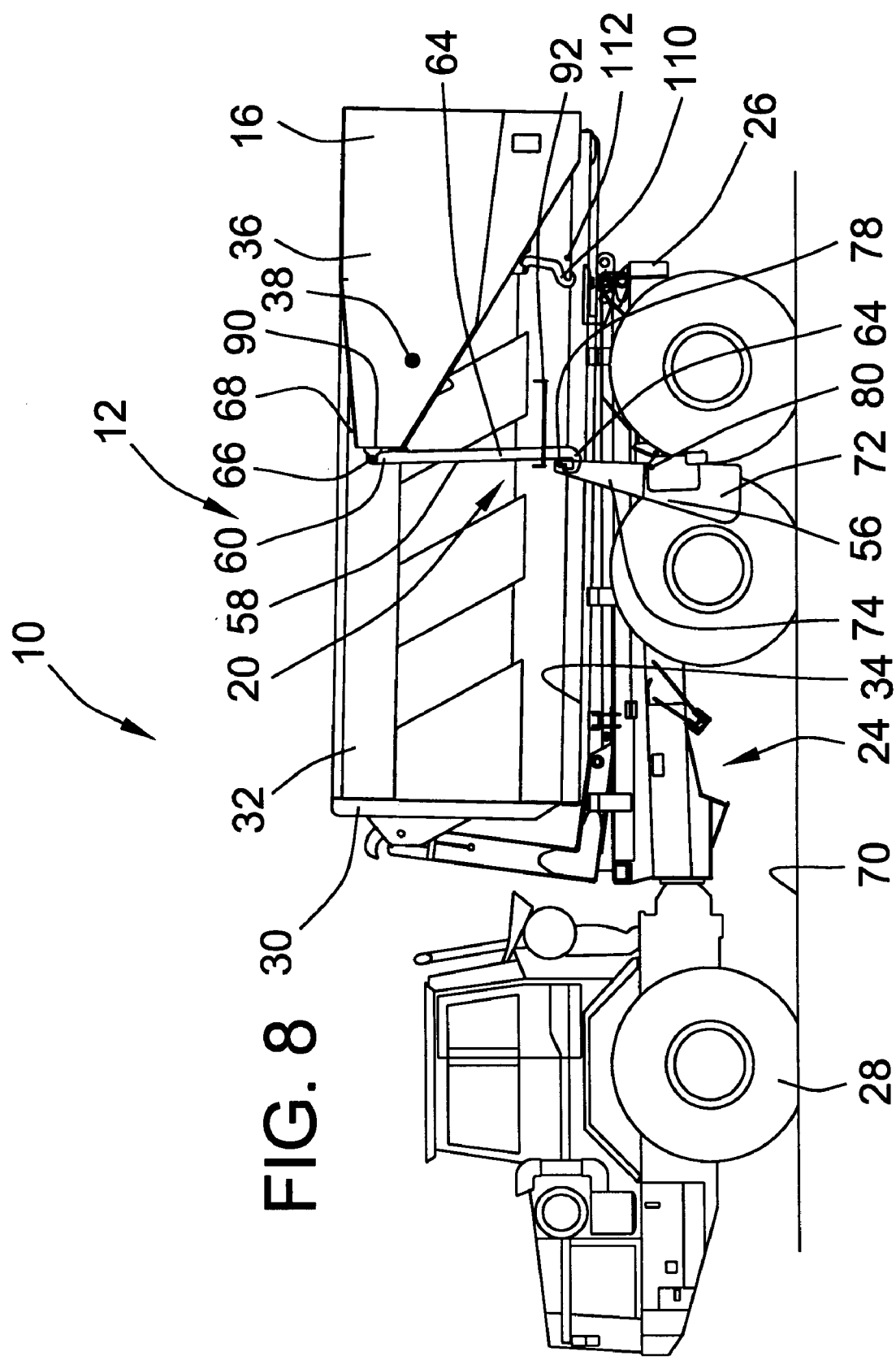

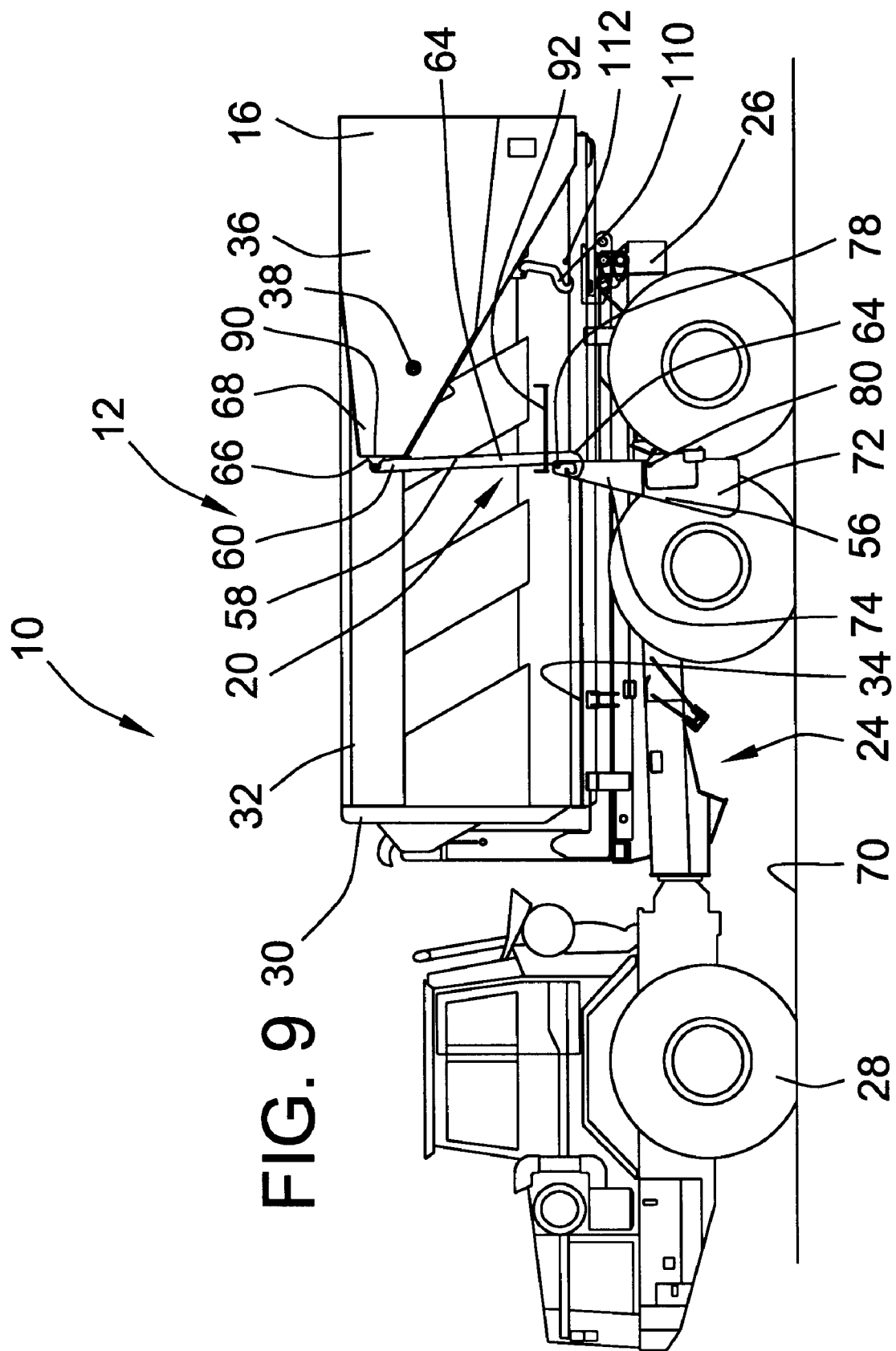

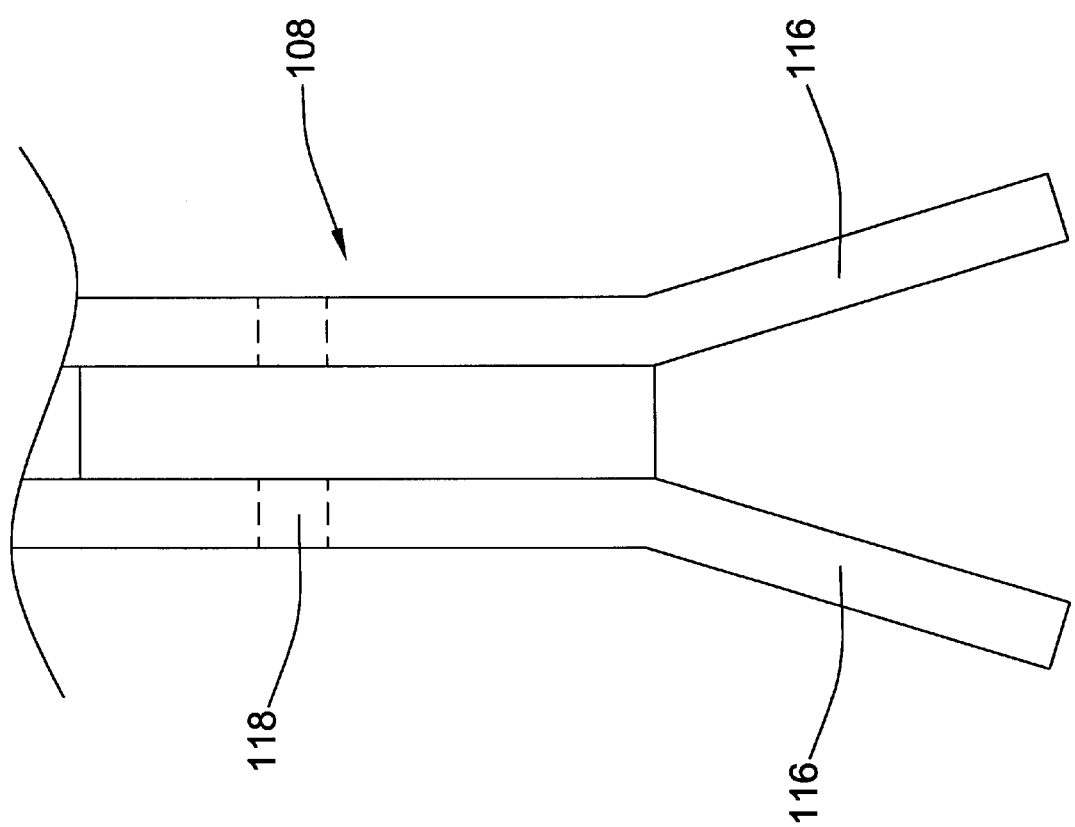

ASSEMBLY FOR AUTOMATICALLY OPENING THE TAILGATE OF A CONTAINER

FIELD OF THE INVENTION

This invention generally relates to containers used to transport materials and, more particularly, to an assembly which automatically opens a tailgate of a container when the container is being dumped by a container transport vehicle.

BACKGROUND OF THE INVENTION

Shipping or storage containers are used in conjunction with compatible container transport vehicles in a variety of different industries for hauling bulk materials including for example, scrap metal. The container transport vehicle typically includes a roll-on, roll-off mechanism for loading the containers onto the frame of the transport vehicle. The containers can then be hauled to their particular destination where the hauled material is dumped. Typically, the containers are designed to be dumped through a hinged rear door on the containers which has hinges either on the top or side of the container. One way in which the rear dumping of the containers can be accomplished is by providing the container transport vehicle with a tilt mechanism which tilts the shipping container allowing the hauled material to slide out of the rear of the container. If the hinges are positioned on the top of the rear doors, however, the hinged door limits the clearance which is available for the dumping operation. In addition, hinges located on either the top or the side of the container are susceptible to damage during hauling and dumping.

In order to ensure that the hinged rear door does not open during the hauling operation, the door is provided with a latch which must be released manually prior to dumping and then manually re-engaged once the hauled material is dumped. Thus, when the transport vehicle reaches the dump site, the operator of the transport vehicle must exit the cab, unlatch and open the rear door and then return to the transport vehicle's control panel, which is generally located in the cab of the transport vehicle, to execute the dumping operation. Once the dumping operation is completed, the operator must once again exit the cab to close and latch the rear doors. Obviously, this procedure is time-consuming, inconvenient, and creates a potentially unsafe condition with the possibility of injury to the vehicle operator, particularly during inclement weather.

One system which is used to automatically open the tailgate of containers that have tailgates which pivot upward relative to the container during a dumping operation utilizes a limited rotating cam which is attached to a vehicle tilt mechanism for tilting the container. This cam is also attached to a hydraulic cylinder for actuating the tilt mechanism. The hydraulic cylinder when actuated first rotates the cam which then contacts an arm on the tailgate and if the resistance of the tailgate required to rotate the tailgate is lower than the resistance required to tilt the container and the tilt mechanism, the tailgate rotates open and the container is then tilted to dump the container. Specifically, during the dumping operation, the hydraulic cylinder extends the piston rod in order to rotate the cam for the cam to push the tailgate such that it pivots into the open position. However, the rotation of the cam subjects the container to forces which act to push the container off the container transport vehicle. This arrangement can subject the container, container tailgate, container transport vehicle, and container loading and tilt mechanisms to some extreme forces which can have a detrimental effect on the stability and reliability of the dumping operation. Compensating for these forces may require specially designed containers, container tailgates, and container transport vehicle components which could significantly increase the cost of the container and the container transport vehicle.

OBJECTS AND SUMMARY OF THE INVENTION

Accordingly, in view of the foregoing, it is a general object of the present invention to provide a highly reliable assembly which automatically opens the rear tailgate of a container when the container is tilted for rear dumping and automatically closes the rear tailgate when the container is returned to a substantially horizontal position after completion of the dumping operation without operator intervention thereby eliminating the need for unlatching and latching and opening and closing of the rear door of the container prior to and after executing a rear dumping operation.

Another object of the present invention is to provide a system for handling and rear dumping containers which automatically opens and closes the rear door or tailgate of a container during the dumping operation without subjecting the container and the container transport vehicle to excessive or unusual forces.

In accordance with these and other objects of the present invention, an assembly is provided which automatically opens the rear tailgate of a container when the container is tilted for rear dumping. In addition, the assembly of the present invention automatically closes the rear tailgate when the container is returned to a substantially horizontal loaded or transport position after the dumping is completed. Thus, the present invention provides a very reliable, quick and convenient method for rear dumping containers. In addition, the assembly is very cost effective as it does not require the addition of any hydraulic components or any costly modifications to account for excessive or unusual forces on the container and/or container transport vehicle as a result of the automatic opening and closing of the tailgate.

The present invention may be used with containers having a tailgate which has a pair of side arms each of which is pivotally connected to a respective one of the side walls of the container such that the tailgate can rotate relative to the container between open and closed positions. These containers are typically used in conjunction with container transport vehicles equipped with a tilt mechanism that can be used to raise the container from a loaded position on the container transport vehicle to a dump position wherein the contents of the container are dumped through the rear of the container.

The assembly of the present invention includes a counterbalance assembly which is pivotally connected to the frame of the container transport vehicle. The assembly also includes a hook member which is pivotally connected at one end thereof to one of the side arms of the tailgate and which has a free end. In order to establish a linkage during the dumping operation, the counterbalance assembly carries a hook pin and the free end of hook member is configured, such as for example with a curled shape, to engage the hook pin. Moreover, the counterbalance assembly and the hook member are positioned on the container transport vehicle and the container respectively such that when the container is tilted into the dump position by the container transport vehicle, the free end of the hook member is engaged with the hook pin establishing the linkage, comprising the counterbalance assembly and the hook member, between the frame of the container transport vehicle and the container tailgate which causes the tailgate to rotate into the open position as the container is tilted relative to the frame of the container transport vehicle into the dump position.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 8 is a side elevational view of the container and container transport vehicle of FIG. 1 showing the container in almost the fully loaded transport position on the container transport vehicle before the counterbalance assembly engages the hook pin.

FIG. 9 is a side elevational view of the container and container transport vehicle of FIG. 1 showing the container in the fully loaded position on the container transport vehicle and the counterbalance assembly in engagement with the body of the tailgate hook member.

FIG. 16 is a bottom plan view of the counterbalance assembly of FIG. 2 showing a flared lead-in on the clevis.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention as defined by the appended claims.

DETAILED DESCRIPTION OF THE PREFERRED EMBODIMENT

Figure 1:
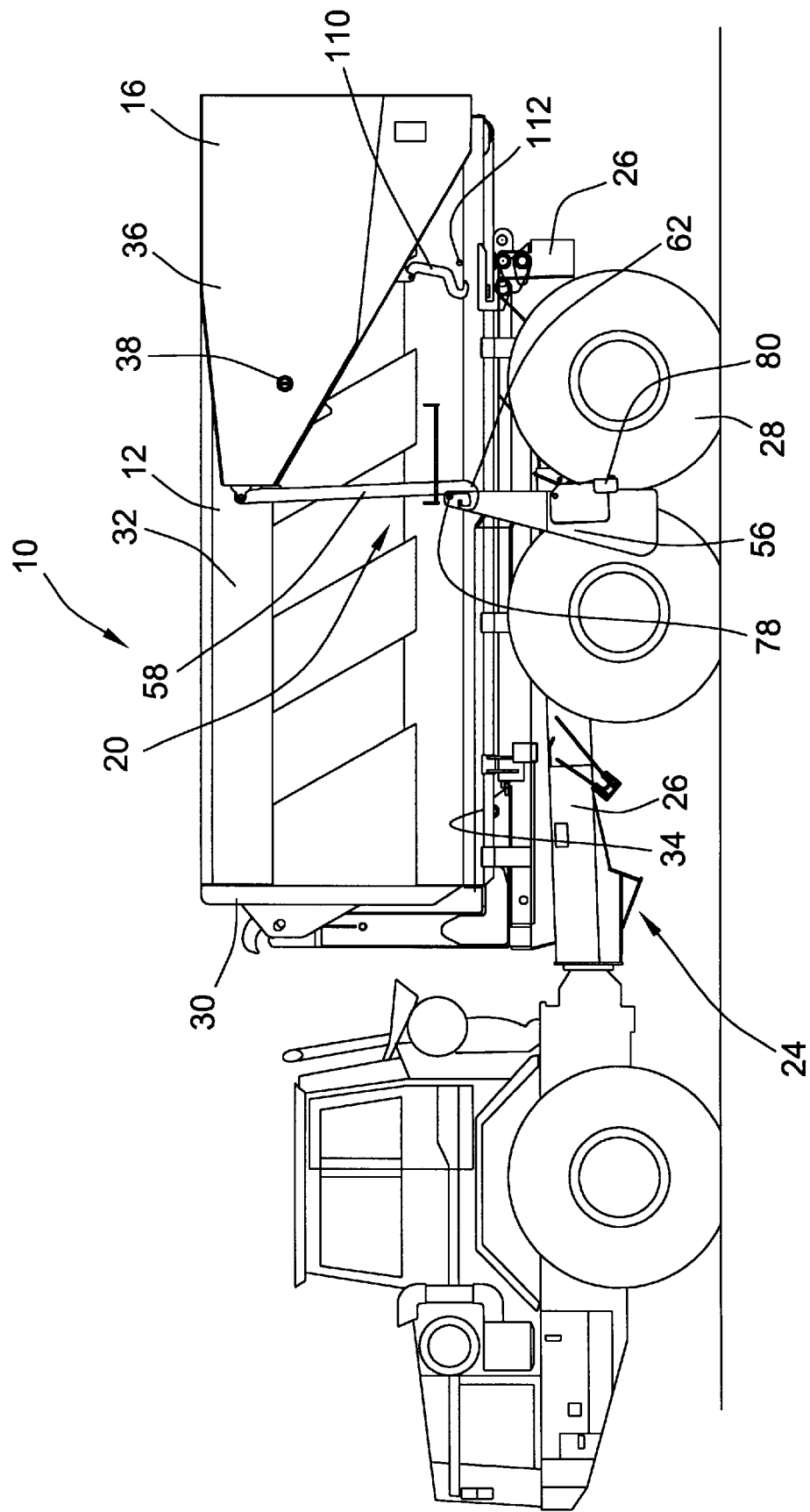
FIG. 1 is a side elevational view of a rear dumping container transport vehicle with a container positioned on the frame of the container transport vehicle, the container transport vehicle and the container including an assembly for automatically opening the tailgate of the container when the container is tilted for rear dumping constructed in accordance with the present invention.

Referring now to the drawings, FIG. 1 shows a rear dumping container transport vehicle 10 with a container 12 positioned on the frame 26 of the container transport vehicle. In accordance with the invention, the container 12 and the container transport vehicle 10 are equipped with an assembly, generally referenced as 20, which automatically opens the tailgate 16 of the container, when the container is tilted for rear dumping. The assembly also automatically allows the tailgate 16 to close when the container 12 is lowered from the dump position back into a generally horizontal, loaded or transport position on the container transport vehicle 10. The tailgate opening assembly thus eliminates the need for an operator to exit the container transport vehicle 10 prior to executing the rear dumping operation to unlatch and open the rear door of the container and then again after completing the dumping operation to close and latch the rear door. Thus, the use of the assembly of the present invention will result in a quick and very convenient method for hauling and dumping rear-dumping containers. Moreover, the tailgate opening assembly automatically opens the tailgate without subjecting the container and tailgate to any unusual or excessive forces which might have a detrimental effect on the stability of the container and the container transport vehicle during the dumping operation. The use of the assembly of the present invention will, therefore, lead to a highly reliable dumping operation without any need for costly modifications to account for excessive or unusual forces on the container transport vehicle, container and/or container tailgate as a result of the automatic opening and closing of the tailgate.

As shown in the illustrated embodiment, the container transport vehicle 10 may include a mobile hauling unit 24 which has a frame 26 that is supported by a plurality of tires 28 which are connected to the frame by an axle (not shown). The phrase container transport vehicle is used for convenience to refer to the illustrated embodiment. It will, of course, be appreciated that the present invention is equally applicable to container handling and dumping structures which are mounted to a stationary support at a fixed site. The container 12 has a front wall 30, opposing and parallel side walls 32 (FIGS. 1 and 2), a floor 34 and a rear tailgate 16 which define an open top so that material can be collected in the container.

Figure 9A:
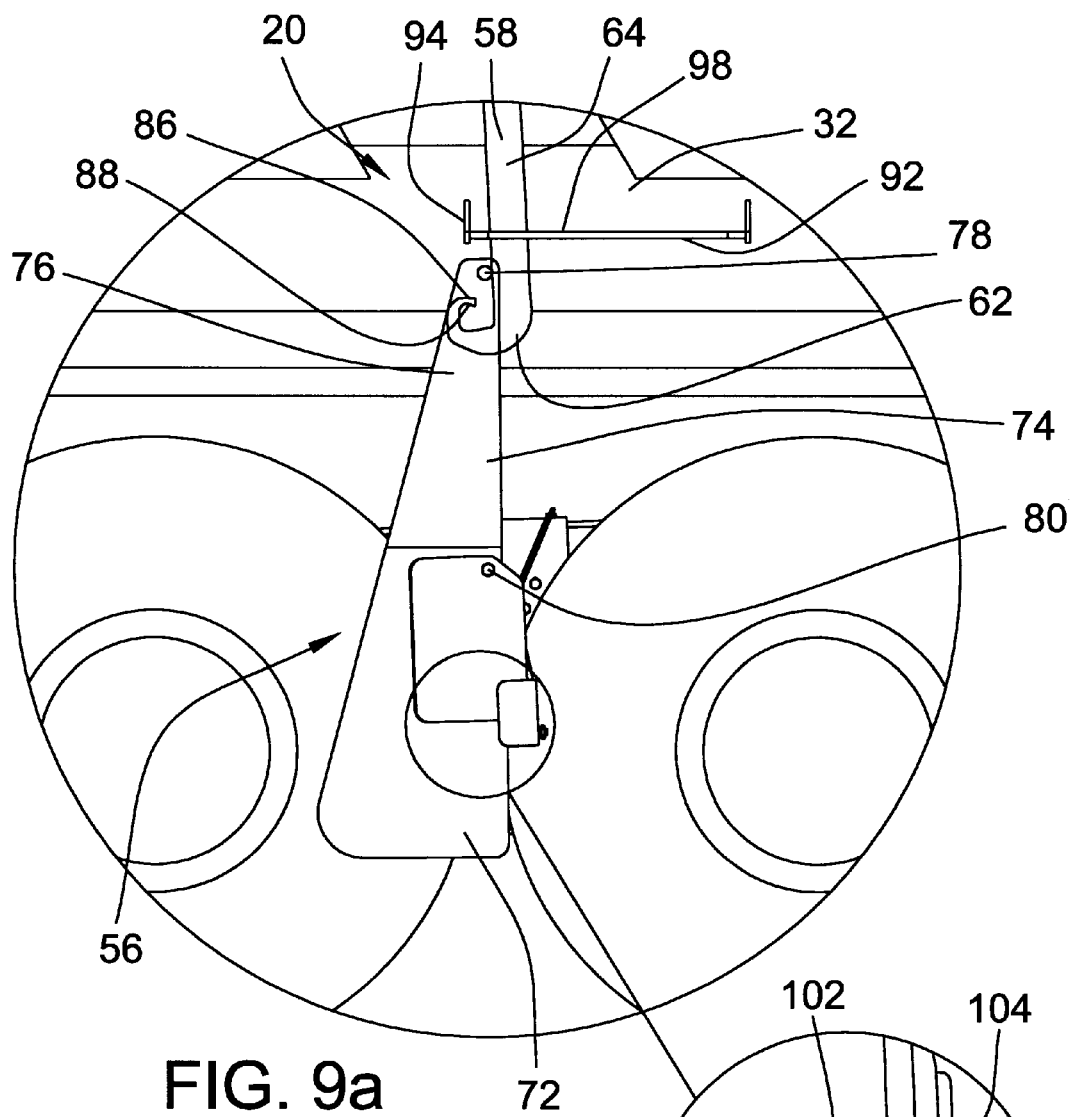
FIG. 9A is an enlarged partial side elevational view of the counterbalance assembly of FIG. 9.
Figure 9B:
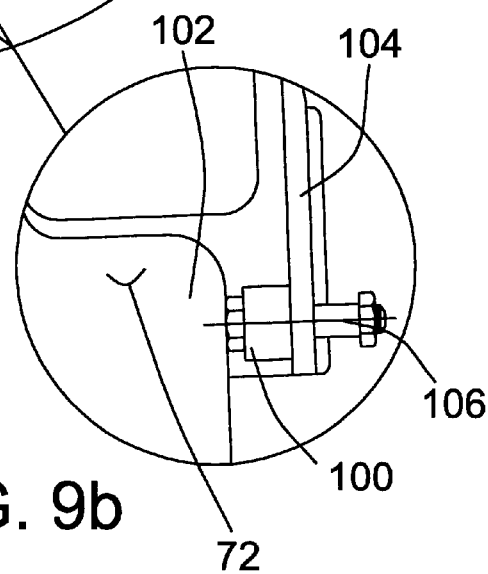
FIG. 9B is an enlarged partial side elevational view of the positioning spring of the counterbalance assembly of FIG. 9A.
Figure 10:
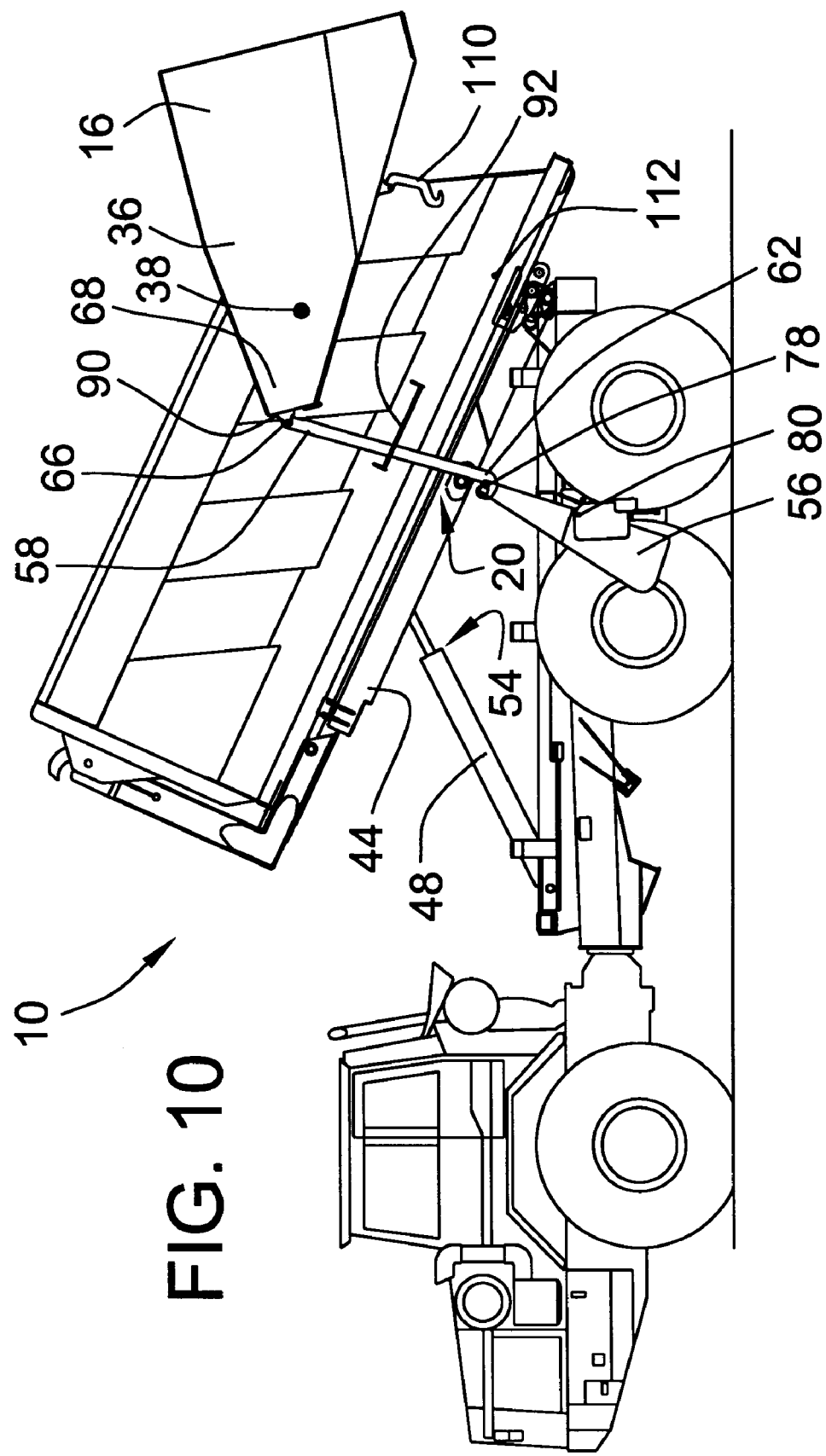
FIG. 10 is a side elevational view of the container and container transport vehicle of FIG. 1 showing the tilt mechanism lifting the container towards the dump position and the tailgate in a partially open position.
Figure 11:
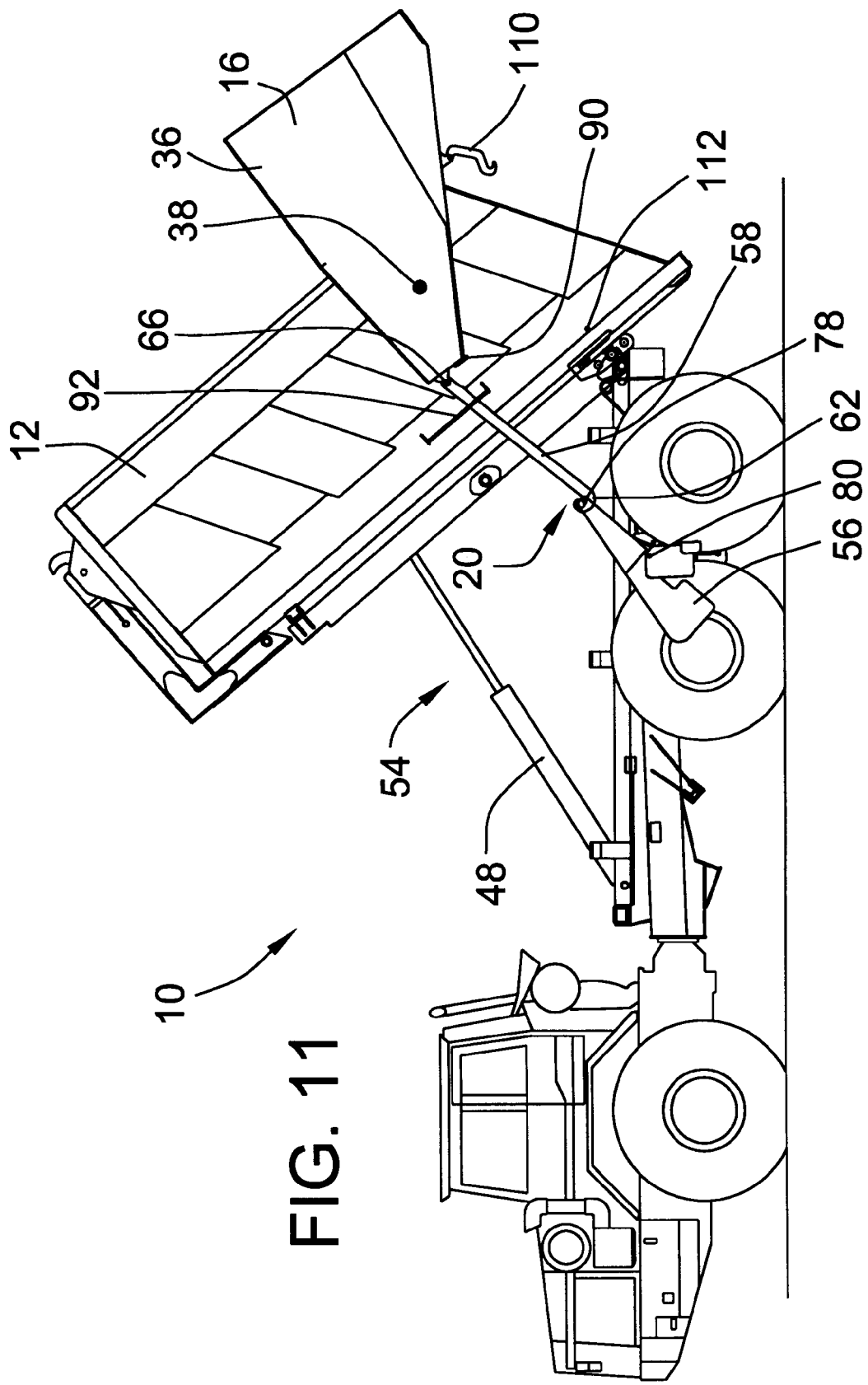
FIG. 11 is a side elevational view of the container and container transport vehicle of FIG. 1 showing the container in the dump position and the tailgate in the open position.

In order to allow for rear dumping of the container 12, the rear tailgate 16 is pivotally connected to the container such that it can move between open (FIG. 11) and closed positions (See FIGS. 9 and 10). In particular, in the illustrated embodiment the tailgate 16 includes a pair of forwardly extending opposing and parallel side arms 36 which partially overlap the side walls 32 of the container. Each side arm 36 is pivotally connected to a respective one of the side walls 32 of the container by a pivot pin 38 such that the tailgate 16 can pivot upwardly relative to the container 12 into an open position as shown in FIG. 11. This type of container tailgate provides excellent clearance for dumping because it does not introduce any obstructions, such as hinges, into the rear opening of the container. In addition, the location of the pivot pins 38 on the side walls of the container eliminates the possibility that the tailgate pivot pins can be damaged during dumping.

Figure 3:
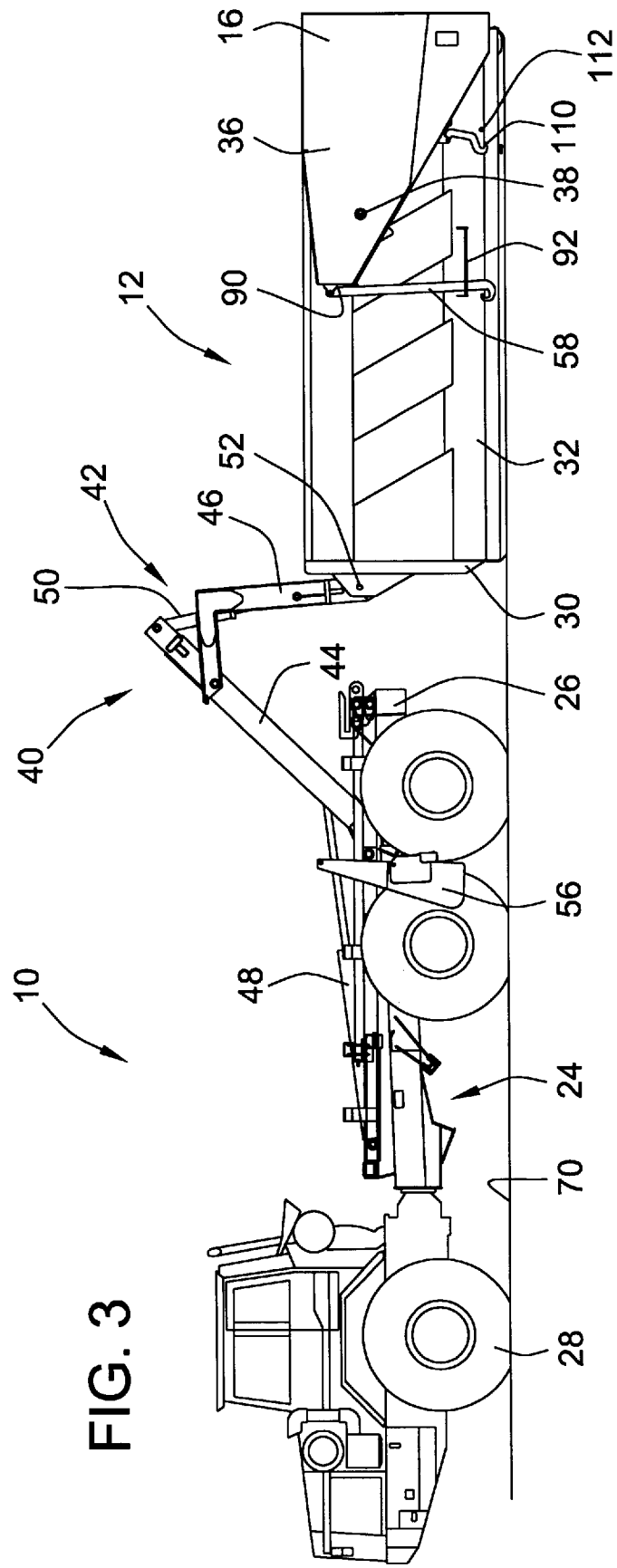
FIG. 3 is a side elevational view of the container and container transport vehicle of FIG. 1 showing the container transport vehicle roll-on, roll-off loading mechanism engaging the container to begin the loading of the container onto the frame of the container transport vehicle.

In order to load the containers onto the frame of the container transport vehicle, the illustrated container transport vehicle 10 is equipped with a conventional roll-on, roll-off container loading mechanism 40. As shown in FIG. 3, the roll-on, roll-off container loading mechanism 40 includes a rotatable extendible and retractable arm 42 which comprises a first link 44 pivotally connected to the frame 26 and a second link 46 pivotally connected to the first link 44. The roll-on, roll-off container loading mechanism 40 also includes first and second hydraulic cylinders 48, 50 which operate in a known manner to maneuver the arm 42 such that it can hook onto and load a container onto the frame 26 of the container transport vehicle 10. In particular, in order to begin the loading operation, the arm 42 is rotated and extended in order to engage a pin 52 carried by the front wall 30 of the container 12 as shown in FIG. 3. Then, as shown in FIGS. 4–9, the arm 42 is rotated and retracted in order to lift and pull the container 12 onto the frame 26 of the container transport vehicle 10. The illustrated container transport vehicle 10 also includes a conventional tilt mechanism 54 as part of the conventional roll on, roll off container loading mechanism 40, which tilts the container 12 from a transport position (FIG. 9) to a dump position (FIG. 11) so that the contents of the container can be dumped out of the rear end thereof In particular, in the illustrated embodiment, the tilt mechanism 54 is included as part of the roll-on, roll-off container loading mechanism 40 with the tilting of the container 12 being accomplished by extension of the first cylinder 48 such that the container tilts upward from the loaded position into the dump position on the first link 44 as shown in FIGS. 9–11.

While the means and components which allow a container to be loaded onto the frame of a container transport vehicle and to be tilted into the dump position have been described in connection with certain preferred embodiments, those skilled in the art will appreciate that the present invention is equally applicable to other container loading and tilting mechanisms. For example, it will be understood from the following description of the tailgate opening assembly that it may also be used with container transport vehicles which utilize a different style of roll-on, roll-off mechanism for loading and unloading containers onto the frame of the container transport vehicle.

In accordance with an important aspect of the present invention, the container transport vehicle 10 and container 12 are equipped with an assembly which automatically opens the tailgate 16 as the container 12 is raised by the tilt mechanism 54 from the transport position with the container loaded on the frame of container transport vehicle (FIG. 9) to the dump position (FIG. 11). Likewise, as the container 12 is lowered back into the transport position, the assembly automatically allows the tailgate 16 to close. The tailgate opening assembly generally comprises a counterbalance assembly 56 which is carried by the container transport vehicle 10 and a hook member 58 which is carried by the container 12. The counterbalance assembly 56 and the hook member 58 are positioned relative to each other on the container transport vehicle 10 and the container 12 respectively, such that when the container 12 is tilted from the transport position to the dump position, the hook member 58 engages the counterbalance assembly 58. As explained in greater detail below, the engagement of the hook member 58 with the counterbalance assembly 56 establishes a linkage, comprising the counterbalance assembly 56 and the hook member 58, connecting the container transport vehicle 10 and the tailgate 16 which enables the tailgate 16 to rotate into the open position as the container 12 is tilted to the dump position as shown in FIGS. 9–11.

Figure 2:
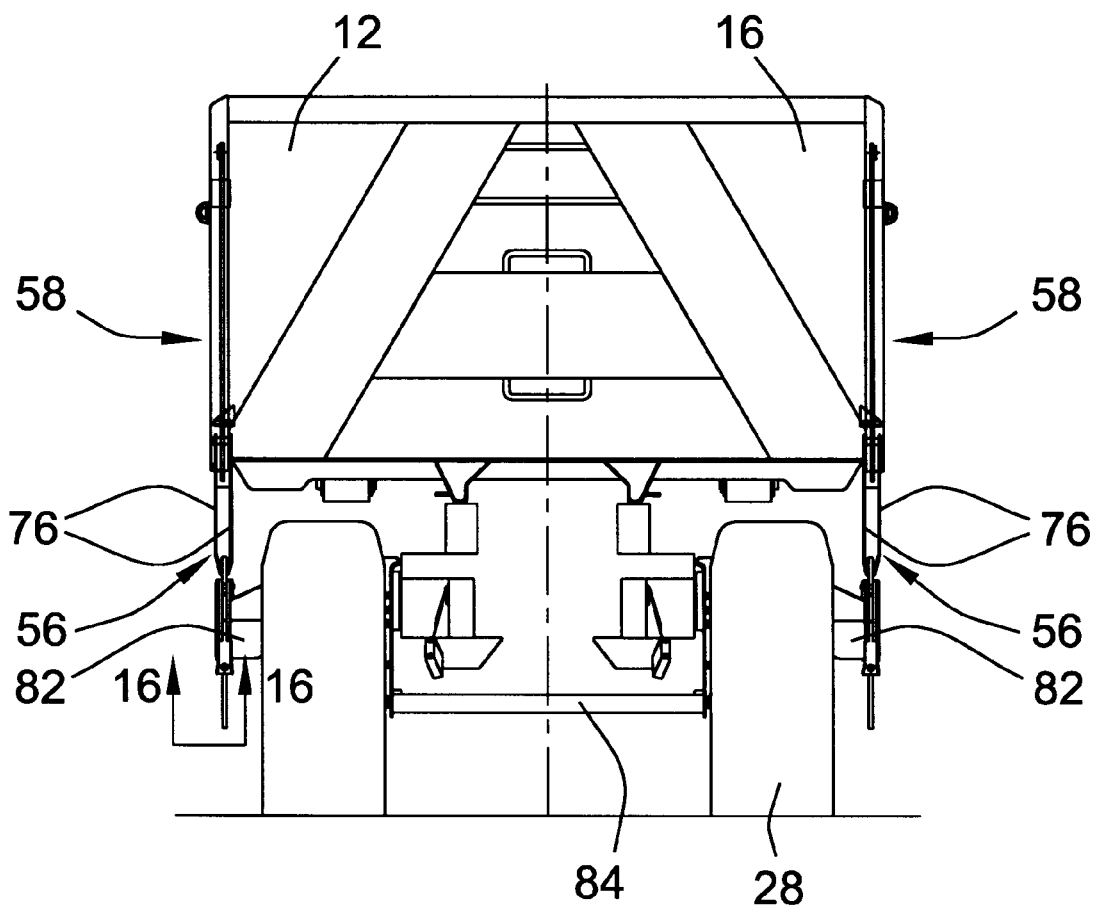
FIG. 2 is a rear elevational view of the container and container transport vehicle of FIG. 1.

For ease of reference herein, the counterbalance assembly 56 and hook member 58 will only be described in connection with the side of the container transport vehicle 10 and container 12 shown in FIGS. 1 and 3–11. However, it will be appreciated that in a preferred embodiment, a hook member 58 and counterbalance assembly 56 are provided on each side of the container 12 and container transport vehicle 10, respectively as best shown in FIG. 2. This arrangement reduces the forces acting on the individual components during the opening and closing of the tailgate 16 and also balances the forces acting on the container 12 and the container transport vehicle 10. Thus, the present invention includes arrangements where a hook member and counterbalance assembly are provided either on only one or on both sides of the container and container transport vehicle.

The hook member 58 generally comprises an upper end 60, a lower or free end 62 which has a curved or curled shape and an intermediate body portion 64. As best shown in FIGS. 8 and 9, the hook member 58 is pivotally connected at its upper end 60 to a respective one of the side arms 36 of the tailgate 16 by a bolt 66 such that the hook member 58 extends downwardly in relation to the container 12. Preferably, the hook member 58 is pivotally connected to the tailgate 16 adjacent the end 68 of the side arm 36, as shown in the illustrated embodiment. Furthermore, the hook member 58 has a preselected length which ensures that the lower end 62 of the hook member does not extend beyond the lower edge of the container 12 and dig into the ground 70 when the container 12 is off loaded from the container transport vehicle 10 onto the ground. As shown in FIG. 1, this enables the container to lay flat when it rests upon the ground 70 without bending or damaging the hook member 58.

Figure 8A:
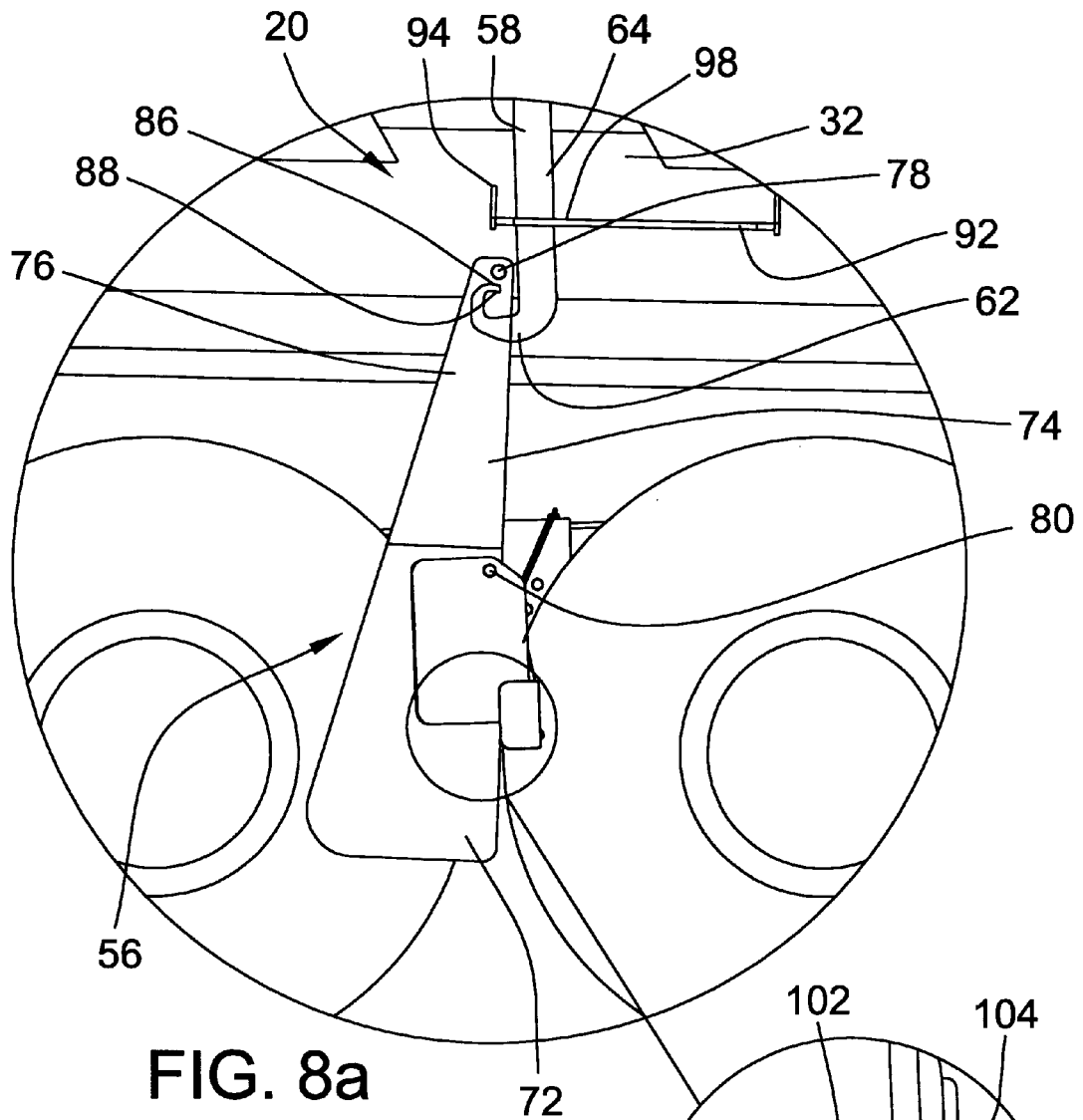
FIG. 8A is an enlarged partial side elevational view of the counterbalance assembly of FIG. 8.
Figure 8B:
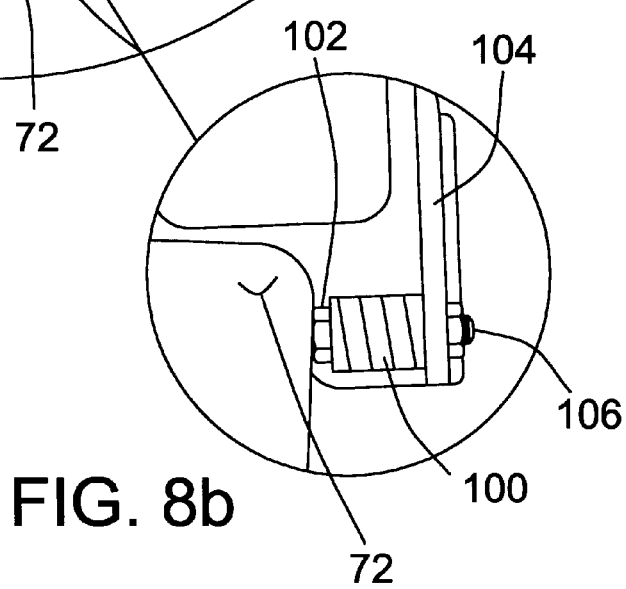
FIG. 8B is an enlarged partial side elevational view of the positioning spring of the counter balance assembly of FIG. 8A.

The counterbalance assembly 56 generally comprises a lower 72 and upper 74 portion as best shown in FIGS. 8A and 9A. The lower portion 72 of the counterbalance assembly 56 essentially consists of a counterweight. The upper portion 74 consists of a pair of spaced opposing and parallel arms 76 which are interconnected by a hook pin 78 adjacent the upper end of the arms 76 are best shown in FIG. 2. The counterbalance assembly 56 is pivotally connected to the container transport vehicle 10 by a bolt 80. In particular, as best shown in FIG. 2, the counterbalance assembly 56 is pivotally attached to an outrigger 82 which is connected to the frame 26 of the container transport vehicle. As also shown in FIG. 2, when counterbalance assemblies are provided on both sides of the container transport vehicle 10, a connecting member 84 may be provided which links the outriggers for the two counterbalance assemblies helping to ensure a proper balance of forces.

In a preferred embodiment, when the container 12 is in the transport position on the container transport vehicle 10, the hook pin 78 contacts the body 64 of the hook member a short distance above the curled lower end 62 as shown in FIGS. 9 and 9A. In contrast, FIGS. 8 and 8A illustrate the positions of the hook member 58 and the hook pin 78 just before the container 12 reaches the transport position on the container transport vehicle 10. When a rear dumping operation is begun, the container 12 tilts upward relative to the container transport vehicle 10 and the counterbalance assembly 56 as shown in FIG. 10. The initial upward movement of the hook member 58 relative to the hook pin 78, causes the hook pin 78 to slide downwardly on the hook member 58 until it is captured by, and thereby engages, the curled free end 62. Once the hook pin 78 engages the curled lower end 62 of the hook member 58, the counterbalance assembly 56 and hook member 58 essentially form a linkage which connects the tailgate 16 and the frame 26 of the container transport vehicle. As the tilt mechanism 54 continues to raise the container 12 as shown in FIGS. 10 and 11, the linked counterbalance assembly 58 and hook member 56 cause the tailgate 16 to rotate relative to container 12 such that when the container 12 reaches the full dump position, the tailgate 16 is in the fully open position (FIG. 11). When the dumping of the container is completed, the container 12 is lowered via the tilt mechanism 54 and the linked counterbalance assembly 56 and hook member 58 once again act to rotate the tailgate 16 relative to the container such that when the container 12 is lowered back into the transport position, the tailgate is in the closed position (See, e.g., FIG. 9).

Figure 12:
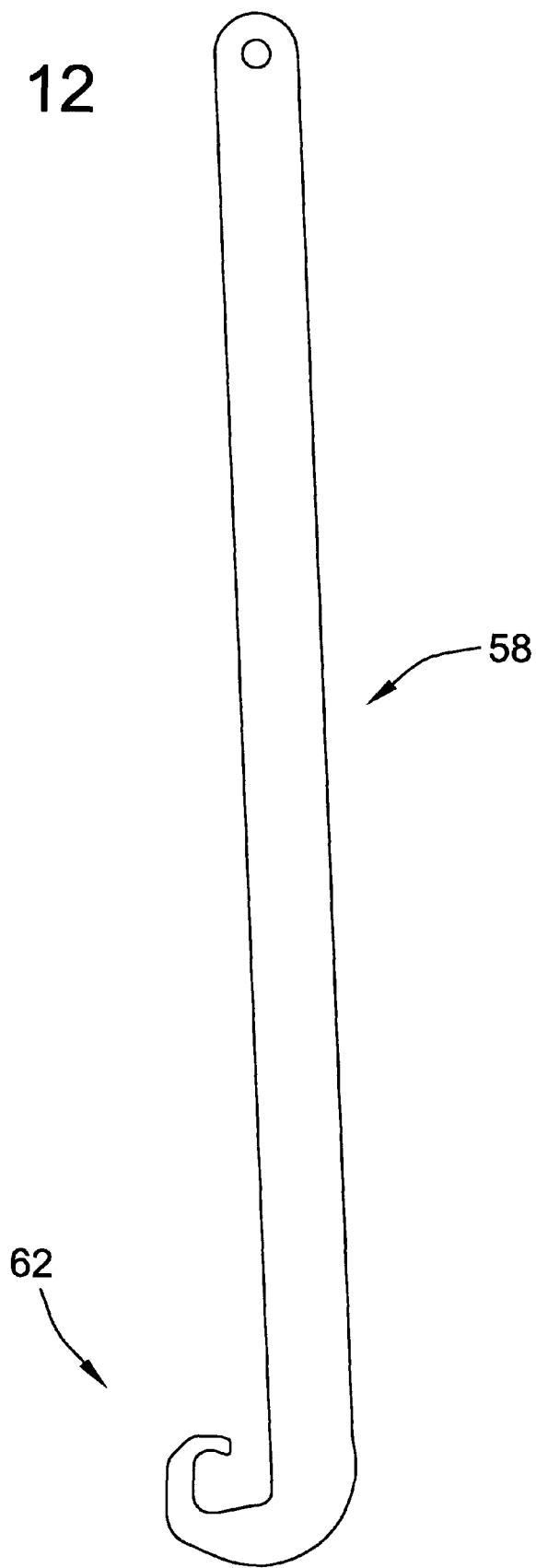
FIG. 12 is a side elevational view of a hook member which has a free end having an alternative configuration.

The curled lower end 62 of the hook member 58 may be configured such that the counterbalance assembly 56 and the hook member 58 will not disengage even if the contents of the container shift during dumping. Specifically, if the contents of the container 12 shift during dumping and contact the lower portion of the tailgate, it may cause the tailgate 16 to jerk upward resulting in the hook member 58 moving downward relative to the hook pin 78. As best shown in FIGS. 8A and 9A, the curled end 62 of the hook member may be configured such that the hook pin 78 will remain captured in the curled end 62 even if a shifting load causes the hook member to move downward relative to the hook pin. In particular, the curled end 62 of the hook member can be configured with an extended portion 86 that forms a pocket 88 in which the hook pin 78 will be captured if the hook member 58 moves downward relative to the hook pin 78 as a result of a load shift. FIG. 12 illustrates an alternative configuration of the curled end 62 of the hook member 58 which does not include the extended portion. It will of course be appreciated that the present invention is not limited to any particular configuration of the free end of the hook member and in fact is equally applicable to other configurations.

Figure 14:
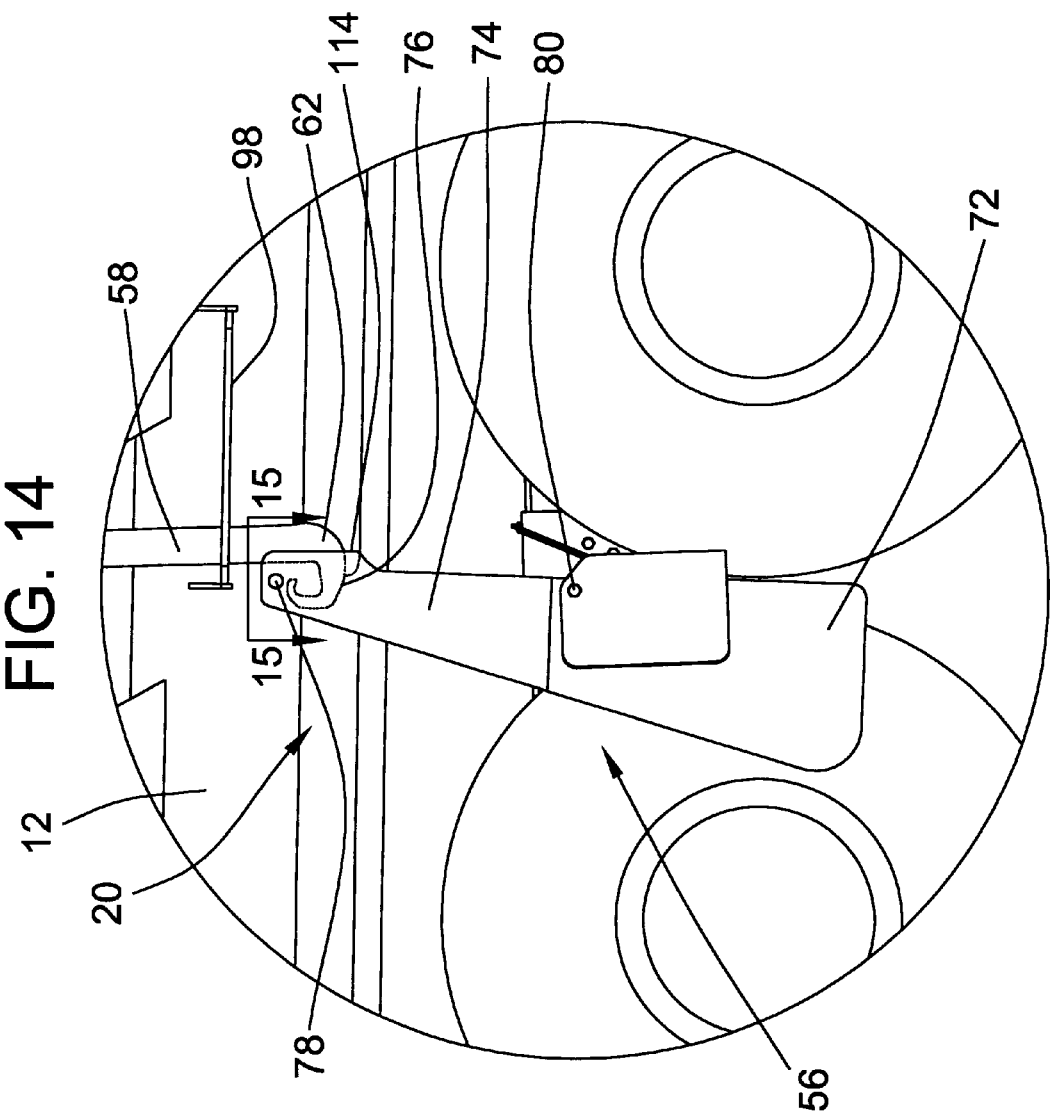
FIG. 14 is an enlarged partial side elevational view of an alternative embodiment of the present invention wherein the counterbalance assembly includes a flared lead-in for the hook member.
Figure 15:
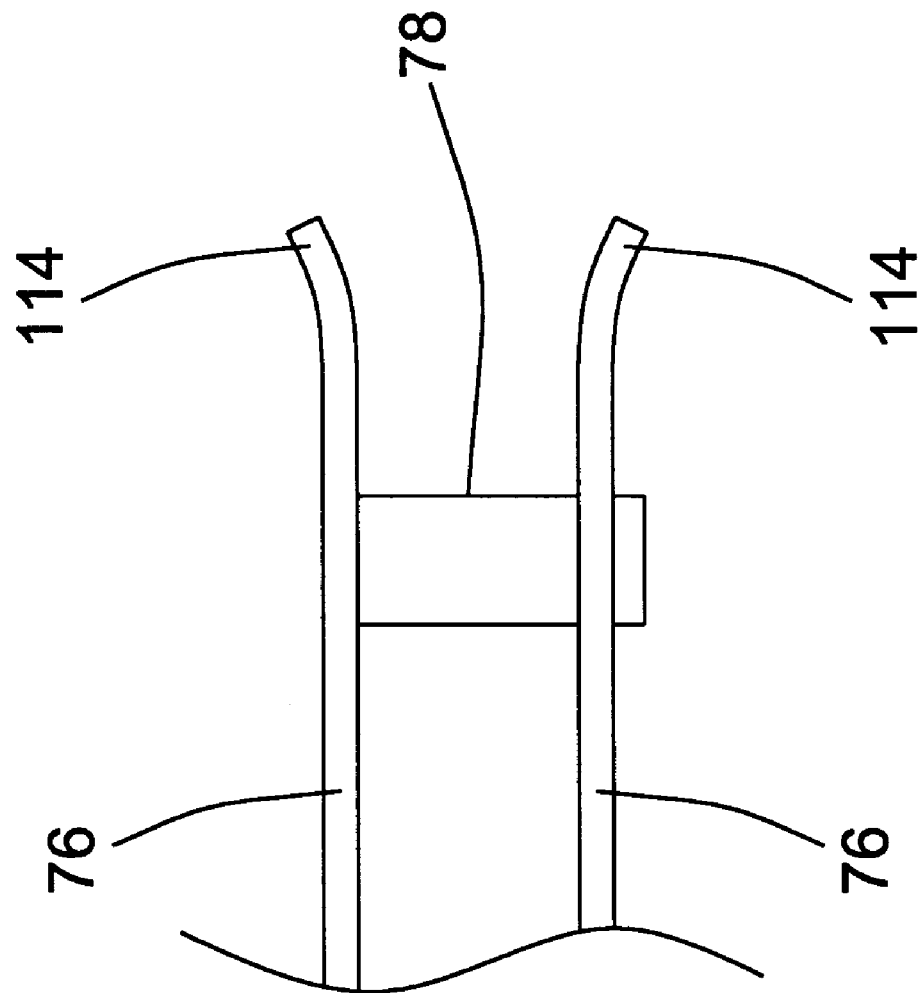
FIG. 15 is an enlarged partial top plan view of the counterbalance assembly of FIG. 14 showing the flared lead-in for the hook member.

In order to help the guide the hook member 58 into engagement with the hook pin 78, the counterbalance assembly 56 may be provided with flared lead-in flanges 114 as shown in FIGS. 14 and 15. In the embodiment of the invention shown in FIGS. 14 and 15, the lead-in flanges I 14 can be provided on the arms 76 of the upper portion 74 of the counterbalance assembly and as the container 12 is moved towards the transport position can contact the hook member 58 and guide it so that it passes between the arms 76 of the upper portion 74 of the counterbalance assembly 56.

In order to ensure that the hook member 58 remains in the proper position during both container loading and dumping, the container may include elements which limit the movement of the hook member. Specifically, as shown in FIGS. 3–8, a stop 90 may be provided on the tailgate 16 which limits rearward rotation of the hook member 58 during the container loading operation. The stop 90 is provided at the end 68 of the tailgate side arm and prevents the hook member 58 from rotating rearward relative to container 12 when the hook pin 78 contacts the hook member as the container is moved into the transport position on the container transport vehicle 10. Thus, the stop 90 ensures that solid positive contact is established between the hook pin 78 and the hook member 58 when the container is loaded onto the container transport vehicle. The stop 90 also helps to ensure that the hook member is in the proper position when the container reaches the loaded transport position on the container transport vehicle.

Moreover, a guide 92 may be provided on the container 12 which helps to stabilize the hook member 58 during loading and dumping. As best shown in FIGS. 8A and 9A, the guide 92 is arranged on the side wall 32 of the container such that the lower portion of the hook member is retained within the guide. The guide 92 includes a forward stop 94 which in conjunction with the stop 90 prevents movement of the hook member relative to the container 12 during loading of the container on the transport vehicle and helps to ensure the proper engagement of the hook member and the hook pin. Side-to-side movement and twisting of the hook member 58 during both loading and dumping is limited by constructing the guide 92 as a slotted plate with the hook member 58 being contained within the slot such that it can only move forward and rearward relative to the container 12.

The counterbalance assembly 56 may also include several additional features which ensure that the hook member 58 properly engages the counterbalance assembly when the container 12 is loaded into the transport position on the container transport vehicle. In particular, as shown in FIGS. 8A, 8B, 9A and 9B, the counterbalance assembly 56 may include a compression spring 100 which helps to ensure a solid positive contact between the hook pin 78 and the hook member 58 when the container 12 is loaded onto the container transport vehicle 10. The compression spring 100 is attached via a shoulder stripper bolt 102 to an extension 104 of the outrigger 82 such that the spring 100 bears on the lower portion 72 of the counterbalance assembly. Prior to the point at which the hook member 58 contacts the hook pin 78 during the container loading operation, the spring 100 is in the position shown in FIGS. 8A and 8B with the bolt head 106 flush with the outrigger extension 104.

Once the hook member 58 contacts the hook pin 78, the continued forward movement of the container 12 to the transport position relative to the container transport vehicle 10 causes the counterbalance assembly 56 to rotate counterclockwise (as defined by reference to FIGS. 8A and 9A) relative to the container transport vehicle and counter to the force of the spring 100 as shown in FIGS. 9A and 9B. When the spring 100 is in the compressed position shown in FIGS. 9A and 9B, the force of the spring 100 ensures that the hook pin 78 bears tightly against the hook member 58. This tight engagement of the hook pin 78 with the hook member 58, in turn, ensures that when the container 12 is raised for dumping, the hook pin 78 is properly engaged and captured by the curled end 62 of the hook member. The position of the hook pin 78 may be varied slightly by adjusting the length of the spring 100 via the bolt 102. This enables the assembly to be adjusted to accommodate for manufacturing tolerances. In addition, the upper and lower portions 72, 74 of the counterbalance assembly may be adapted so that the upper portion 74 may be adjusted relative to the lower portion 72 in order to allow for varying of the position of the hook pin 78.

Figure 13:
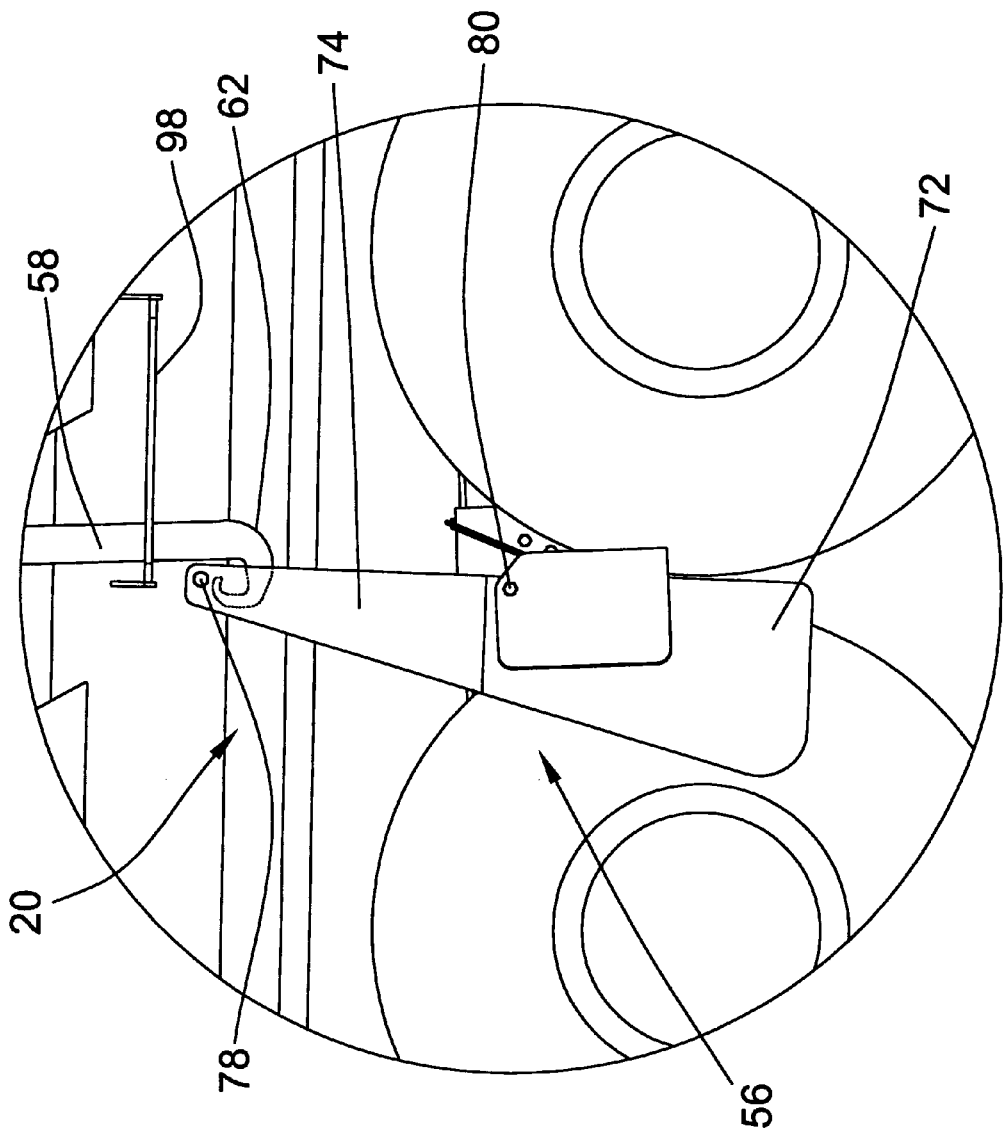
FIG. 13 is an enlarged partial side elevational view of an alternative embodiment of the present invention wherein the counterbalance assembly does not utilize a positioning spring.

It will of course be appreciated that the counterbalance assembly 56 does not necessarily have to include the positioning spring 100. One way in which the positioning spring can be eliminated is simply by providing more weight in the lower portion 72 of the counterbalance assembly 56. FIG. 13 illustrates an alternative arrangement for the counterbalance assembly 56, which does not incorporate a positioning spring.

In order to ensure that the counterbalance assembly 56 seats in the proper position when it rotates back after a container 12 is dumped, the counterbalance assembly may include a clevis 108. In particular, as best shown in FIG. 11 the clevis 108 includes a generally u-shaped cut-out in the lower portion 72 of the counterbalance assembly which engages a correspondingly shaped portion of the frame outrigger 82 when the counterbalance assembly 56 is in the pre-dump position. As can be appreciated, the clevis 108 ensures that the counterbalance assembly seats in the proper position when it rotates back into the pre-dump position after a dumping operation. As shown in FIG. 16, the clevis 108 may be provided with flared lead-in flanges 116 which will help guide the lower portion 72 of the counterbalance assembly 56 as it rotates back into the pre-dump position. As also shown in FIG. 16, the clevis 108 can include a hole 118 which would allow the counterbalance assembly 56 to be pinned in place via a pin or bolt (not shown) as desired, such as when the container transport vehicle 10 is moving.

Figure 4:
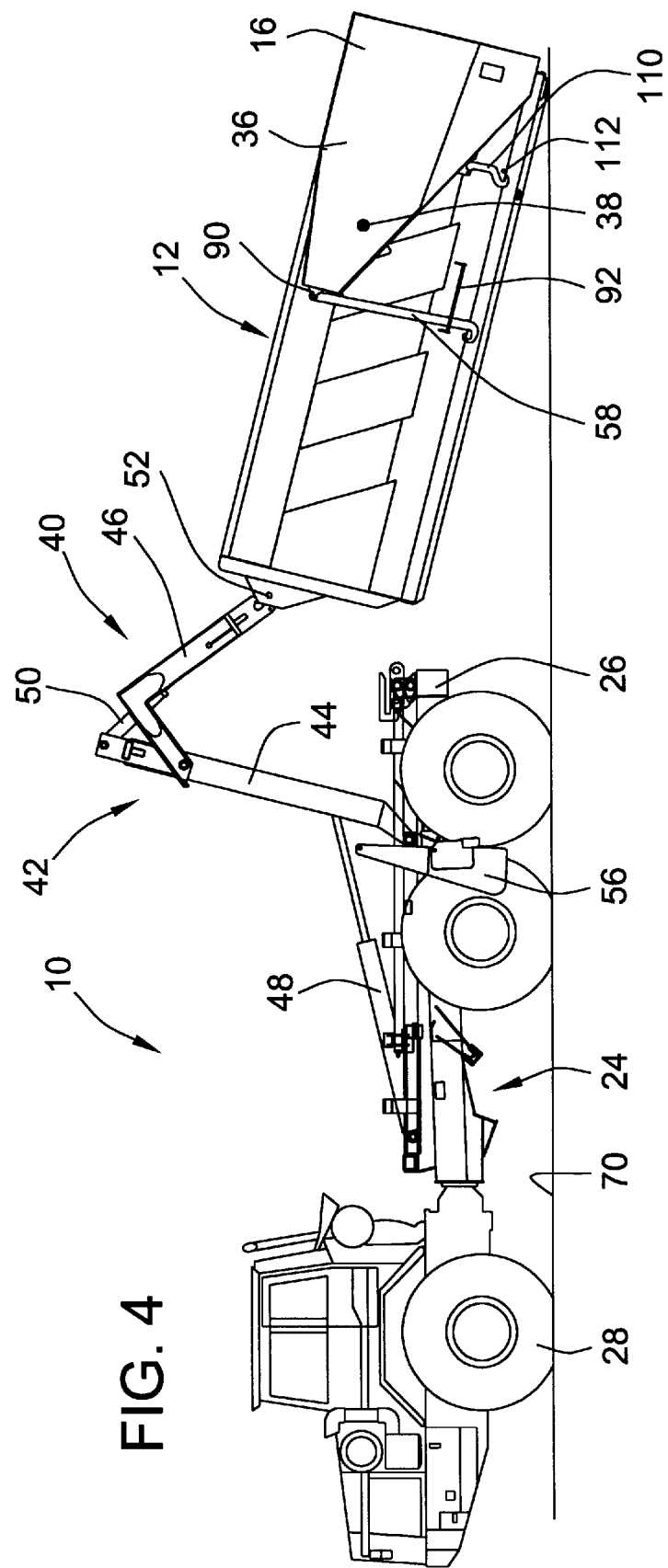
FIG. 4 is a side elevational view of the container and container transport vehicle of FIG. 1 showing the container transport vehicle roll-on, roll-off loading mechanism loading the container onto the container transport vehicle.
Figure 5:
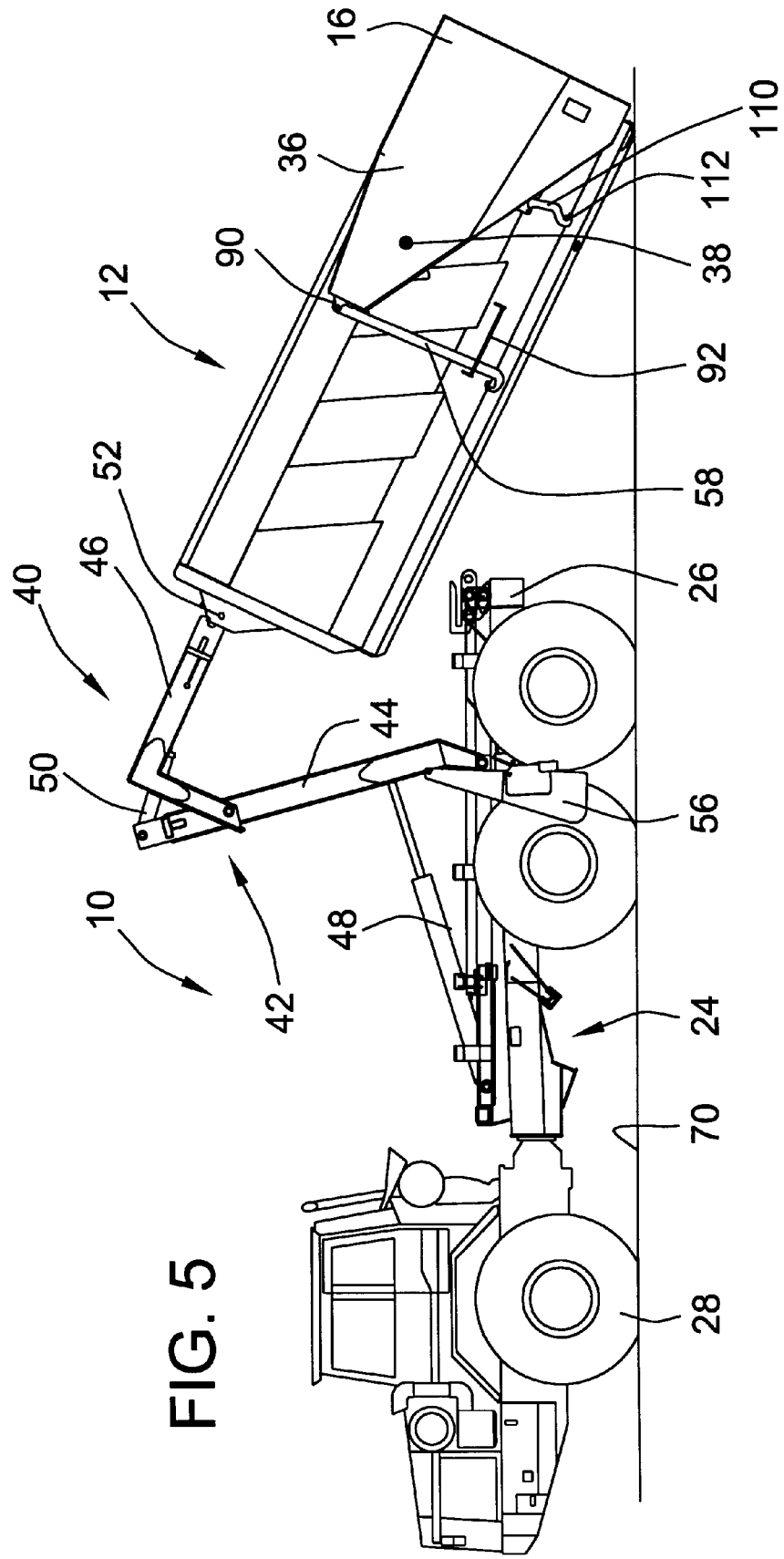
FIG. 5 is a side elevational view of the container and container transport vehicle of FIG. 1 showing the container transport vehicle roll-on, roll-off loading mechanism loading the container onto the container transport vehicle and the tailgate latch hook engaging the latch pin.
Figure 6:
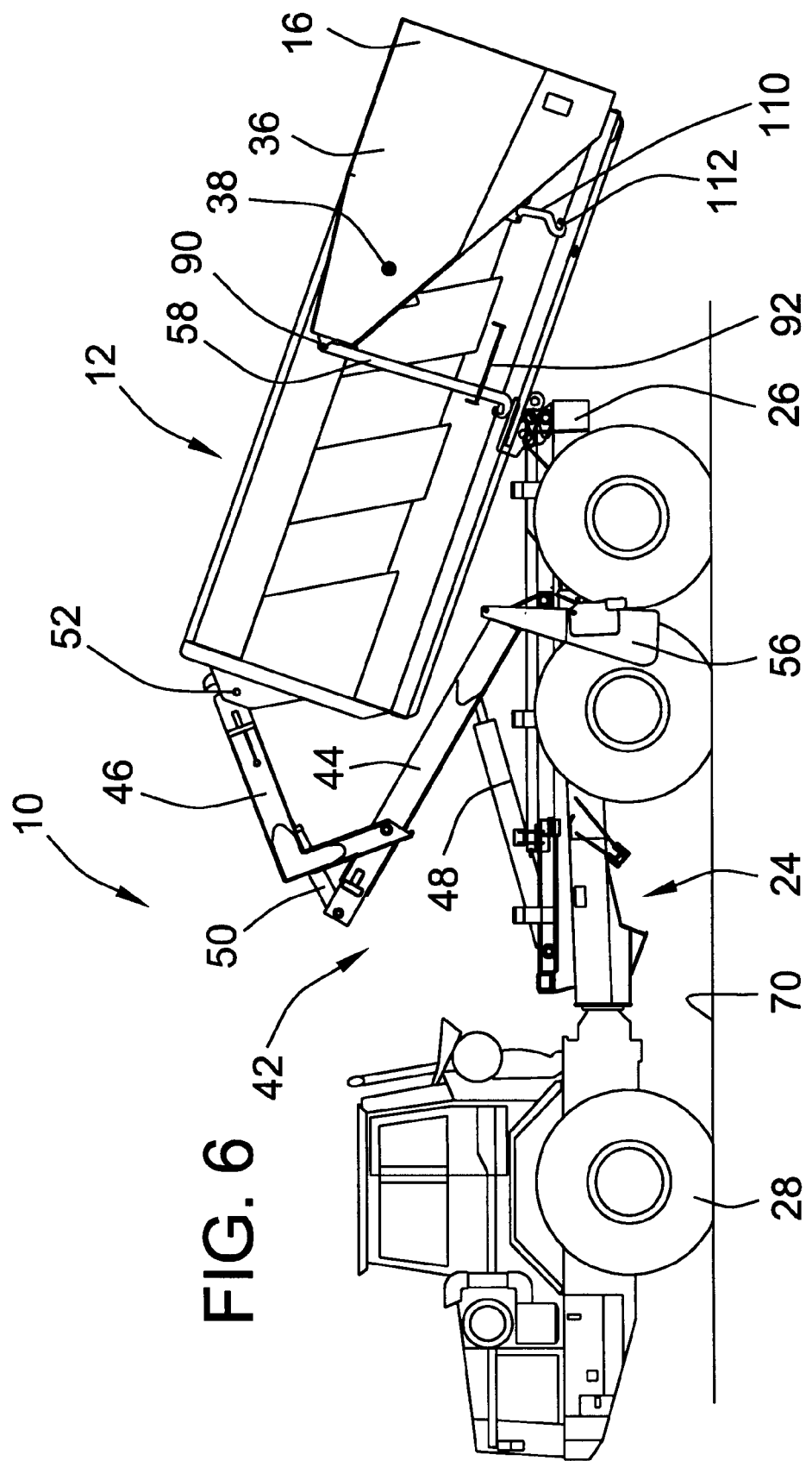
FIG. 6 is a side elevational view of the container and container transport vehicle of FIG. 1 showing the container transport vehicle roll-on, roll-off loading mechanism loading the container onto the container transport vehicle and the tailgate latch hook partially rotated out of engagement with the latch pin.

In order to provide added protection against the tailgate 16 popping open due to a shifting of the contents of the container 12 during the loading operation of the container onto the container transport vehicle, the container may be equipped with an automatically engaging and disengaging latch assembly. As best shown in FIGS. 3–9 which illustrate the container loading operation, the container 12 may include a latch assembly which comprises a latch hook 110 pivotally attached to the tailgate side arm 36 and a latch pin 112 on the side wall 32 of the container 12. The latch hook 110 is weighted such that it hangs generally vertically from the tailgate 16 throughout the container loading and dumping operations. The latch pin 112 is positioned slightly rearward on the container 12 relative to the position of the latch hook 110. Accordingly, when the container 12 is in a substantially horizontal position, the latch hook 110 does not engage the latch pin 112 (See, e.g., FIGS. 3 and 7–9). However, as shown in FIGS. 4 and 5, when the container 12 is being loaded onto the container transport vehicle 10, the weight of the latch hook 110 causes it to swing into engagement with the latch pin 112 thereby locking the tailgate 16 in the closed position. This prevents the tailgate 16 from popping open if the contents of the container shift and contact the lower end of the tailgate during loading.

Figure 7:
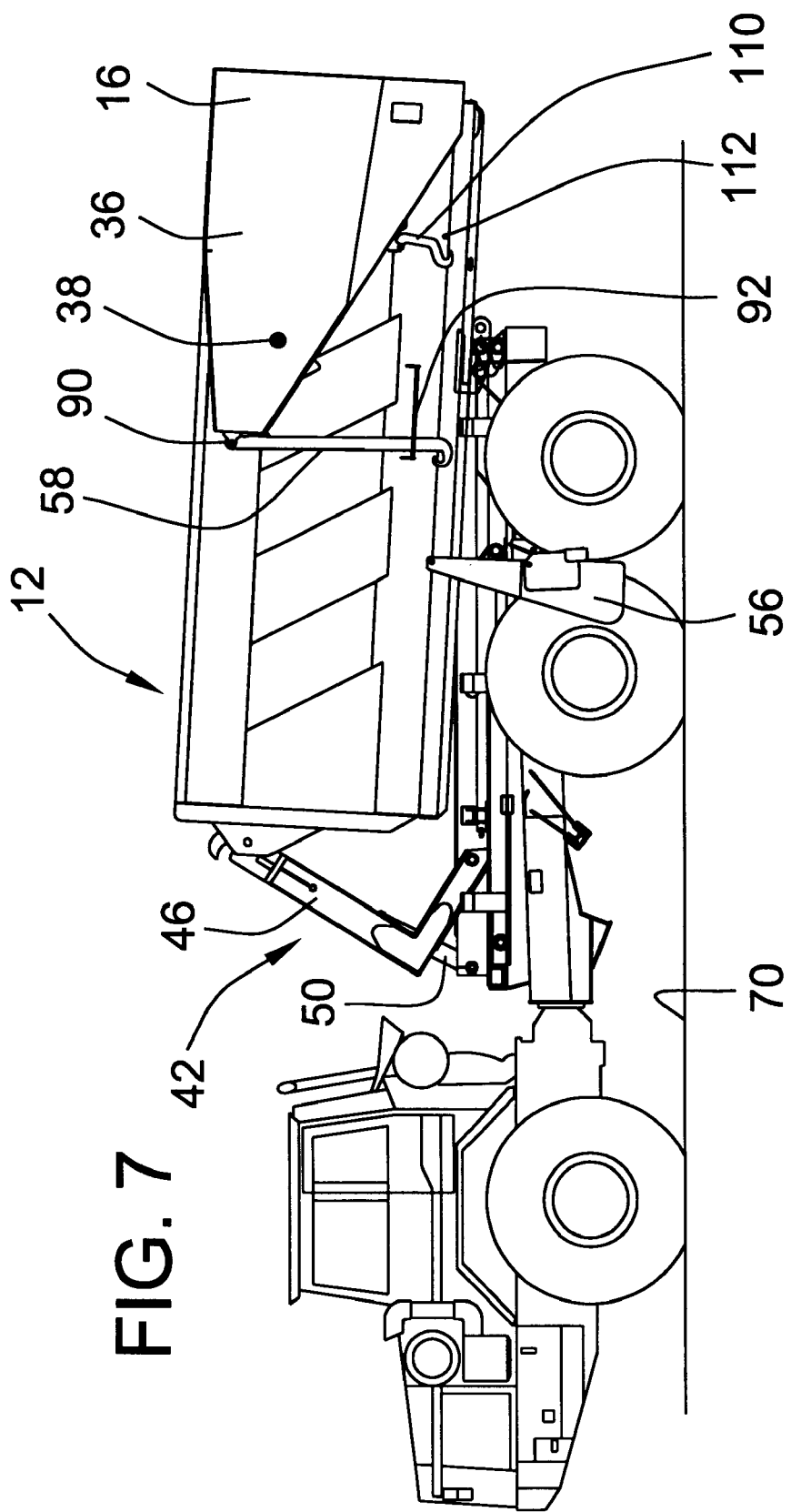
FIG. 7 is a side elevational view of the container and container transport vehicle of FIG. 1 showing the container transport vehicle roll-on, roll-off loading mechanism loading the container onto the container transport vehicle and the tailgate latch hook rotated out of engagement with the latch pin.

As shown in FIGS. 7–9, once the container 12 returns to approximately the horizontal position in the later stages of the container loading operation, the weight of the latch hook 110 causes it to swing out of engagement with the latch pin 112. In order to ensure that the tailgate 16 does not become stuck during container dumping as a result of the latch assembly, the latch pin 112 and the latch hook 110 must be positioned such that during dumping the latch hook clears the latch pin without engaging it. In addition, the latch pin 112 can be designed such that it will fracture in the event that the latch hook I 10 does engage the latch pin during the dumping operation.

It will thus be appreciated that a highly reliable assembly is provided which eliminates the need for the operator of a container transport vehicle to unlatch and open the rear doors of a container before executing a rear dumping operation. Likewise, there is no need for the operator to close and latch the rear door after completion of the rear dumping operation. Moreover, the assembly does not require the addition of any hydraulic cylinders to the container transport vehicle, making the assembly very cost effective as well as easy to maintain.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. An assembly for automatically opening a tailgate of a container when the container is rear dumped by a container transport vehicle, the container having a front wall, opposing side walls, a floor and a tailgate, the tailgate having a rear wall and a pair of arms extending from opposing sides of the rear wall and wherein each arm is pivotally connected to a respective one of the side walls such that the tailgate rotates between a closed position and an open position and the container transport vehicle being adapted to receive and carry the container in a transport position and having a frame and a tilt mechanism for tilting the container between the transport position and a dump position, the assembly comprising: a counterbalance assembly pivotally connected to and positioned on the frame of the container transport vehicle, such that when the container is tilted from the transport position to the dump position by the container transport vehicle, a free end of a hook member connected and pivotable relative to one of the arms of the tailgate couples with the counterbalance assembly thereby establishing a linkage of the counterbalance assembly and the hook member that connects the frame of the container transport vehicle and the container tailgate causing the tailgate to rotate into the open position as the container is tilted to the dump position.

2. The assembly of claim 1 wherein the hook member is pivotally connected to the tailgate adjacent the end of the one of the tailgate arms.

3. The assembly of claim 1 wherein the free end of the hook member is curled.

4. The assembly of claim 3 wherein the curled free end of the hook member is configured so as to retain the counter balance assembly hook pin when the hook member moves downward relative to the hook pin as a result of a load shifting into the tailgate during tilting of the container.

5. The assembly of claim 1 wherein the side walls of the container have a lower edge and the hook member has a preselected length such that when the tailgate is in the closed position the hook member does not extend beyond the lower edge of the side walls of the container.

6. The assembly of claim 1 further including a stop arranged on the container so as to limit rearward pivoting of the hook member relative to the container.

7. The assembly of claim 6 wherein the stop is arranged on one of the tailgate arms.

8. The assembly of claim 1 further including a guide arranged on the container and within which the hook member is retained so as to prevent twisting and lateral movement of the hook member relative to the container.

9. The assembly of claim 1 wherein the counterbalance assembly comprises a counterweight and a pair of opposing and parallel arms extending from the counterweight and which support the hook pin.

10. The assembly of claim 9 wherein each of the arms has a flared portion adapted to facilitate engagement of the free end of the hook member with the hook pin.

11. The assembly of claim 9 wherein the length of the arms is selectively adjustable.

12. The assembly of claim 1 further including a positioning spring arranged on the frame of the vehicle such that when the tailgate is in the closed position, the spring applies a preselected force against the counterbalance assembly which ensures positive engagement between the hook member and the hook pin.

13. The assembly of claim 12 wherein the force applied by the spring on the counterbalance assembly is selectively adjustable.

14. The assembly of claim 1 further including a clevis positioned on the frame of the container transport vehicle and on which the counterbalance assembly seats when the container is in the transport position on the container transport vehicle.

15. The assembly of claim 1 further including an assembly for automatically latching and unlatching the tailgate of the container as the container is loaded onto the container transport vehicle.

16. A container having a tailgate which automatically opens when the container is rear dumped by a container transport vehicle adapted to receive and carry the container in a transport position and having a frame, a tilt mechanism for tilting the container between the transport position and a dump position and a counterbalance assembly which is pivotally connected to the frame of the container transport vehicle, the container comprising a front wall, opposing side walls, a floor, a tailgate, the tailgate having a rear wall and a pair of arms extending from opposing sides of the rear wall and wherein each arm is pivotally connected to a respective one of the side walls such that the tailgate rotates between a closed position and an open position, and a hook member connected and pivotable relative to one of the arms of the tailgate and having a free end which interconnects with the counterbalance assembly when the container is tilted from the transport position to the dump position by the container transport vehicle thereby establishing a linkage of the counterbalance assembly and the hook member that has a substantially fixed length and connects the frame of the container transport vehicle and the container tailgate and causes the tailgate to rotate into the open position as the container is tilted to the dump position.

17. The container of claim 16 wherein the hook member is pivotally connected to the tailgate adjacent the end of the one of the tailgate arms.

18. The container of claim 16 wherein the free end of the hook member is curled.

19. The container of claim 18 wherein the curled free end of the hook member is configured so as to retain the hook pin when the hook member moves downward relative to the hook pin as a result of a load shifting into the tailgate during tilting of the container.

20. The container of claim 16 wherein the side walls of the container have a lower edge and the hook member has a preselected length such that when the tailgate is in the closed position the hook member does not extend beyond the lower edge of the side walls of the container.

21. The container of claim 16 further including a stop arranged on the container so as to limit rearward pivoting of the hook member relative to the container.

22. The container of claim 21 wherein the stop is arranged on one of the arms of the tailgate.

23. The container of claim 16 further including a guide arranged on the container and within which the hook member is retained so as to prevent twisting and lateral movement of the hook member relative to the container.

24. The container of claim 23 wherein the guide is adapted to limit forward pivoting of the hook member relative to the container.

25. The container of claim 16 further including an assembly for automatically latching and unlatching the tailgate of the container as the container is loaded onto the container transport vehicle.

26. The container of claim 25 wherein the latch assembly comprises a latch hook pivotally connected to a respective one of the side arms of the tailgate which is weighted such that the latch hook hangs in a generally vertical position during the loading and dumping of the container and a latch pin arranged on the container such that when the container is loaded into the transport position on the container transport vehicle the latch hook engages the latch pin and when the container is tilted into the dump position the latch hook does not engage the latch pin.

27. The container of claim 26 wherein the latch pin is arranged slightly rearwardly on the container relative to the latch hook.

28. The container of claim 26 wherein the latch pin is adapted such that it will fracture in the event the latch hook engages the latch pin when the container is tilted into the dump position.

29. A method for automatically opening a tailgate of a container when the container is rear dumped by a container transport vehicle adapted to receive and carry the container in a transport position, the method comprising the steps of:

loading the container onto the container transport vehicle such that a hook member connected and pivotable relative to one of the arms of the tailgate moves into engagement with a counterbalance assembly pivotally connected to the frame of the container transport vehicle;

tilting the container from the transport position to a dump position with a tilt mechanism provided on the container transport vehicle; and interconnecting the counterbalance assembly and the hook member as the container is tilted to the dump position thereby establishing a positive linkage between the counterbalance assembly and the hook member which connects the frame of the container transport vehicle with the tailgate resulting in the rotation of the tailgate into the open position as the container is tilted to the dump position.

30. The method of claim 29 further including the step of limiting rearward pivoting of the hook member relative to the container during loading of the container through a stop arranged on the container.

31. The method of claim 29 further including the step of retaining the hook member in a guide arranged on the container so as to prevent twisting and lateral movement of the hook member relative to the container.

32. The method of claim 29 further including the steps of automatically latching the tailgate in the closed position as it is loaded onto the container transport vehicle and automatically unlatching the tailgate once the container is in the transport position on the container transport vehicle.

33. An assembly for automatically latching and unlatching the tailgate of a container as the container is loaded into a transport position wherein the container is substantially parallel to the ground on a container transport vehicle, the container having a pair of opposing side walls, a front wall and a floor and the tailgate having a rear wall and a pair of arms extending from opposing sides of the rear wall each of which is pivotally connected to a respective one of the side walls of the container such that the tailgate rotates between a closed position and an open position, the assembly comprising a latch hook pivotally connected to a respective one of the side arms of the tailgate and weighted such that the latch hook hangs in a generally vertical position during the loading, transport and dumping of the container and a latch pin arranged on the container such that the latch hook engages the latch pin when the container is loaded into the transport position on the container transport vehicle and the latch hook does not engage the latch pin when the container is in the transport position and when the container is tilted into the dump position.

34. The assembly of claim 33 wherein the latch pin is arranged slightly rearwardly on the container relative to the latch hook.

35. The assembly of claim 33 wherein the latch pin is adapted such that it will fracture in the event the latch hook engages the latch pin when the container is tilted into the dump position.

36. An assembly for automatically controlling opening of a gate on a container when the container is dumped by a container transport vehicle, the gate being mounted on the container for movement between a closed position and an open position and the container transport vehicle being adapted to receive and carry the container in a transport position and having a dump mechanism for moving the container between the transport position and a dump position, the assembly comprising a first connecting element carried by and pivotable relative to the gate such that when the container is received into the transport position on the container transport vehicle, a second connecting element carried by the container transport vehicle couples with the first connecting element thereby establishing a linkage that controls movement of the gate into the open position as the container is moved into the dump position.

37. The assembly of claim 36 wherein the first connecting element comprises a hook member carried by the container.

38. The assembly of claim 37 wherein the hook member is connected to the container gate.

39. The assembly of claim 36 wherein the second connecting element comprises a counterbalance assembly pivotally mounted on the container transport vehicle.

40. The assembly of claim 39 wherein the first connecting element has a curled portion and the counterbalance assembly includes a hook pin, the hook pin being received and retained in the curled portion of the first connecting element as the container is moved into the dump position.

41. The assembly of claim 36 further including a latch assembly carried by the container for automatically latching the gate of the container as the container is loaded into the transport position on the container transport vehicle and automatically unlatching the gate of the container when the container reaches the transport position.

42. An assembly for automatically controlling opening of a gate on a container when the container is dumped by a container transport vehicle, the gate being mounted on the container for movement between a closed position and an open position and the container transport vehicle being adapted to receive and carry the container in a transport position and having a dump mechanism for moving the container between the transport position and a dump position, the assembly comprising a counterbalance assembly carried by the container transport vehicle such that when the container is received into the transport position on the container transport vehicle, a hook member carried by the container engages the counterbalance assembly thereby establishing a linkage that assists in holding the container to the container transport vehicle and controls movement of the gate into the open position as the dump mechanism moves the container into the dump position.

43. The assembly of claim 42 wherein the hook member has a curled portion and the counterbalance assembly includes a hook pin, the hook pin being received and retained in the curled portion of the hook member as the container is moved into the dump position.

44. The assembly of claim 42 further including a latch assembly carried by the container for automatically latching the gate of the container as the container is loaded into the transport position on the container transport vehicle and automatically unlatching the gate of the container when the container reaches the transport position.

45. An assembly for automatically controlling opening of a gate on a container when the container is dumped by a container transport vehicle, the gate being mounted on the container for movement between a closed position and an open position and the container transport vehicle being adapted to receive and carry the container in a transport position and having a dump mechanism for moving the container between the transport position and a dump position, the assembly comprising a first connecting element carried by the container such that when the container is received into the transport position on the container transport vehicle, a second connecting element carried by the container transport vehicle engages the first connecting element thereby establishing a linkage that controls movement of the gate into the open position as the container is moved into the dump position and a latch assembly carried by the container for automatically latching the gate of the container as the container is loaded into the transport position on the container transport vehicle and automatically unlatching the gate of the container when the container reaches the transport position.

46. An assembly for automatically controlling opening of a gate on a container when the container is dumped by a container transport vehicle, the gate being mounted on the container for movement between a closed position and an open position and the container transport vehicle being adapted to receive and carry the container in a transport position and having a dump mechanism for moving the container between the transport position and a dump position, the assembly comprising a counterbalance assembly carried by the container transport vehicle such that when the container is received into the transport position on the container transport vehicle, a hook member carried by the container engages the counterbalance assembly thereby establishing a linkage that controls movement of the gate into the open position as the dump mechanism moves the container into the dump position and a latch assembly carried by the container for automatically latching the gate of the container as the container is loaded into the transport position on the container transport vehicle and automatically unlatching the gate of the container when the container reaches the transport position.

47. A method for automatically opening a tailgate of a container when the container is rear dumped by a container transport vehicle adapted to receive and carry the container in a transport position, the method comprising the steps of:

loading the container onto the container transport vehicle such that a hook member connected to one of the arms of the tailgate moves into engagement with a counterbalance assembly pivotally connected to the frame of the container transport vehicle;

automatically latching the tailgate in the closed position as it is loaded onto the container transport vehicle;

automatically unlatching the tailgate once the container is in the transport position on the container transport vehicle;

tilting the container from the transport position to a dump position with a tilt mechanism provided on the container transport vehicle; and interconnecting the counterbalance assembly and the hook member as the container is tilted to the dump position thereby establishing a positive linkage between the counterbalance assembly and the hook member which has a substantially fixed length and connects the frame of the container transport vehicle with the tailgate resulting in the rotation of the tailgate into the open position as the container is tilted to the dump position.

* * * * *